United States Patent [19]

Lo et al.

[11] Patent Number: 5,032,562

[45] Date of Patent: Jul. 16, 1991

[54] CATALYST COMPOSITION AND PROCESS FOR POLYMERIZING POLYMERS HAVING MULTIMODAL MOLECULAR WEIGHT DISTRIBUTION

[75] Inventors: Frederick Y. Lo, Edison; Thomas E. Nowlin; Pradeep P. Shirodkar, both of Somerset, all of N.J.

[73] Assignee: Mobil Oil Corporation, Fairfax, Va.

[21] Appl. No.: 457,432

[22] Filed: Dec. 27, 1989

[51] Int. Cl.$^5$ .............................................. C08F 4/646
[52] U.S. Cl. ................................... 502/111; 502/104; 502/113; 502/115; 502/117; 502/120; 502/125; 502/127
[58] Field of Search ............... 502/113, 115, 117, 120, 502/125, 127, 104, 111

[56] References Cited

U.S. PATENT DOCUMENTS

| | | |
|---|---|---|
| 456,916 | 12/1889 | Kissin . |
| 3,135,809 | 6/1964 | Bosmajian .......................... 502/103 |
| 4,320,786 | 4/1982 | Bacskai ............................... 526/152 |
| 4,338,424 | 7/1982 | Morita et al. ......................... 526/65 |
| 4,404,344 | 9/1983 | Sinn et al. ............................ 526/160 |
| 4,414,369 | 11/1983 | Kuroda et al. ....................... 526/340 |
| 4,420,592 | 12/1983 | Kato et al. ............................. 526/65 |
| 4,525,550 | 6/1985 | Warzelhan et al. .................. 526/116 |
| 4,542,199 | 9/1985 | Kaminsky et al. ................... 526/160 |
| 4,563,659 | 2/1986 | Warzelhan et al. .................. 502/111 |
| 4,578,373 | 3/1986 | Graves ................................. 502/104 |
| 4,701,432 | 10/1987 | Welborn, Jr. ........................ 502/113 |
| 4,703,094 | 10/1987 | Raufast .................................. 526/65 |

OTHER PUBLICATIONS

Sinn et al., Angew. Chem. Int. Ed. Engl 19 (1980) 5, pp. 390–392.
Kaminsky et al., Makromol. Chem., Rapid Commun. 5, 225–228 (1984).
Soga et al., Makromol Chem., Rapid Commun. 8, 305–310 (1987).
Kaminsky et al., Makromol. Chem., Rapid Commun. 4, 417–421 (1983).

*Primary Examiner*—Patrick P. Garvin
*Assistant Examiner*—Brent M. Pebbles
*Attorney, Agent, or Firm*—Alexander J. McKillop; Charles J. Speciale; Marina V. Schneller

[57] ABSTRACT

There is disclosed a supported olefin polymerization catalyst composition comprising a precursor and a catalyst activator. The precursor comprises a magnesium compound, e.g., dibutylmagnesium, a cyclopentadienyl group-containing zirconium compound, and a titanium and/or a vanadium compound, e.g., $TiCl_4$, and an organic compound, e.g., an alcohol. The catalyst activator is a mixture of a conventional Ziegler/Natta co-catalyst and a zirconium sites activator, e.g., methylaluminumoxane. The catalyst is used in the presence of small amounts of hydrogen to produce polymers having multimodal molecular weight distribution in a single reactor.

19 Claims, 3 Drawing Sheets

CATALYST COMPOSITION AND PROCESS FOR POLYMERIZING POLYMERS HAVING MULTIMODAL MOLECULAR WEIGHT DISTRIBUTION

BACKGROUND OF THE INVENTION

1. Field of the Invention

The present invention relates to a method for polymerizing alpha-olefins to form polymers having multimodal molecular weight distribution, a catalyst used in such a method and a method for producing such a catalyst. In particular, the present invention relates to a catalyst, and a method for preparation thereof, which produces high density polyethylene (HDPE) having a multimodal molecular weight distribution. The invention is also directed to an olefin polymerization process carried out with the catalyst of the invention which produces polymers of multimodal molecular weight distribution in a single polymerization reactor under steady state polymerization conditions.

2. Description of Prior Art

Various processes have been proposed for the production of polymers having multimodal molecular weight distribution. The term "multimodal molecular weight distribution" means that two or more peaks of different molecular weights are readily discernible in a plot of molecular weight as a function of relative proportions of the portion of the polymer having the given molecular weight, such as that obtained by gel permeation chromatography (GPC) analysis of the polymer. One such process known to us utilizes tandem reactors operated in series, wherein in the first reactor the olefin is polymerized in the presence of catalyst and substantially in the absence of hydrogen as a chain transfer agent. The product is transferred to the second, downstream reactor wherein polymerization is conducted in the presence of relatively large amounts of hydrogen. The first reactor produces the high molecular weight component, and the second reactor the low molecular weight component of the final polymer product, e.g., see Morita et al, U.S. Pat. No. 4,338,424; Kuroda et al, U.S. Pat. No. 4,414,369; Raufaut, U.S. Pat. No. 4,703,094; and Kato et al, U.S. Pat. No. 4,420,592. As will be apparent to those skilled in the art, such a method of producing multimodal molecular weight distribution polymers is expensive, cumbersome, and time consuming.

It is also known that certain zirconium (Zr)-based olefin polymerization catalysts activated with an aluminum compound of the aluminoxane type produce relatively short chain length polymers even in the absence of a chain transfer agent, such as hydrogen, e.g., see Kaminsky et al, U.S. Pat. No. 4,542,199 and Sinn et al, U.S. Pat. No. 4,404,344, the entire contents of both of which are incorporated herein by reference.

Ziegler catalyst systems containing more than one transition metals are also known, e.g., Warzelhan et al, U.S. Pat. No. 4,525,550, disclose a catalyst system containing vanadium and zirconium, and Warzelhan et al, U.S. Pat. No. 4,568,659 disclose a catalyst system containing vanadium, titanium and zirconium.

It is a primary object of the present invention to provide an olefin polymerization catalyst capable of producing polymers of multimodal molecular weight distribution in a single polymerization reactor under steady state polymerization conditions.

SUMMARY OF THE INVENTION

A supported, olefin polymerization catalyst of this invention comprises a catalyst precursor composition and a catalyst activator.

The catalyst precursor composition is supported on a porous carrier and comprises a magnesium compound, a zirconium compound and a compound selected from the group consisting of titanium compounds, vanadium compounds and mixtures thereof. The magnesium, zirconium, titanium and vanadium compounds must be soluble in an organic solvent, such as benzene, toluene or tetrahydrofuran, used in the catalyst synthesis. More particularly, the magnesium compound has the formula

where R, $R^1$, $R^2$ and $R^3$ are each alkyl groups, X is a halogen, m and n are each 0, 1 or 2, providing that $m+n$ equals to the valence of Mg, and k is 0, 1, or 2; the zirconium compound has the formula

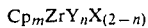

wherein Cp is cyclopentadienyl, m is 1, 2, or 3, Y and X are each a halogen, a $C_1$–$C_6$ alkyl or H, and n is 0 or 1; and the titanium or vanadium compounds are such compounds which are soluble in the organic solvents, e.g., titanium tetrachloride ($TiCl_4$), titanium tetrabromide ($TiBr_4$), vanadylchloride ($VOCl_3$) or vanadium tetrachloride ($VCl_4$).

The catalyst activator is a mixture of a conventional Ziegler-Natta co-catalyst, such as a compound of the elements of Group IB, IIA, IIB, IIIB, or IVB of the Periodic Chart of the Elements, e.g., triethylaluminum or trimethylaluminum, and at least one aluminoxane compound of the formula

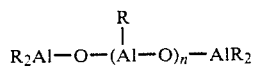

for a linear aluminoxane, where n is 0 to 50 and/or

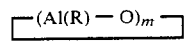

for a cyclic aluminoxane, where m is an integer from 3 to 50, and R for both the linear and cyclic aluminoxane is the same or different linear, branched or cyclic alkyl group of 1–12 carbons, such as methyl, ethyl, propyl, isobutyl or cyclohexyl.

The catalyst polymerizes olefins, such as alpha-olefins, e.g., ethylene, propylene, 1-butene or 1-hexene, or mixtures thereof, to polymers having multimodal molecular weight distribution in a single polymerization reactor.

DETAILED DESCRIPTION OF THE INVENTION

Catalyst Synthesis

Figure 1:
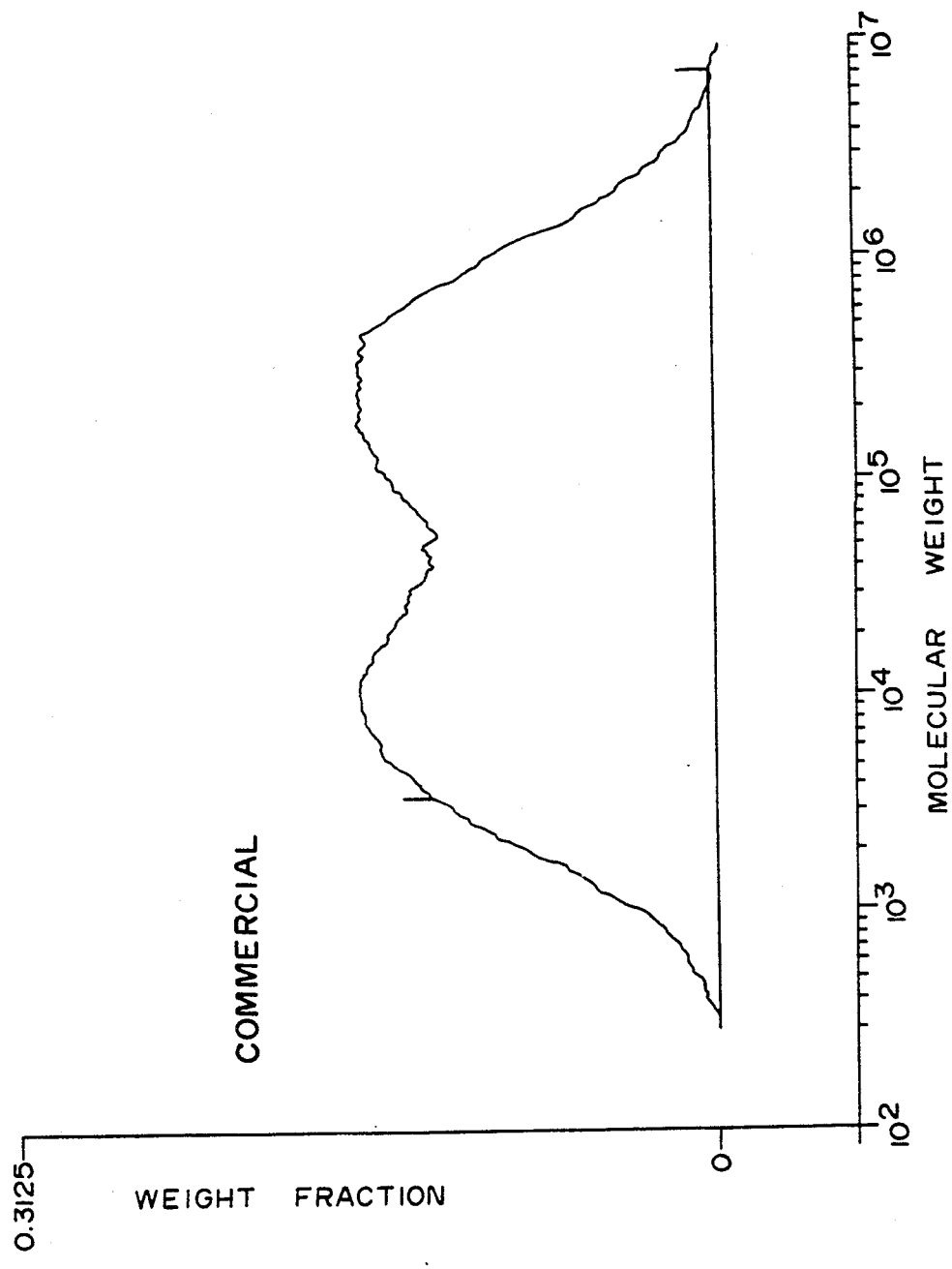
FIG. 1 is a Gel Permeation Chromatography (GPC) chromatogram of molecular weight distribution of a commercially-produced bimodal polymer (Cain L5005, obtained from Cain Chemicals, Inc.).

The catalyst precursor is supported on a carrier. The carrier materials used herein are usually inorganic, solid, particulate porous materials. These carrier materials include such inorganic materials as oxides of silicon and/or aluminum. The carrier materials are used in the form of dry powders having an average particle size of from about 1 micro to about 250 microns, preferably from about 10 microns to about 150 microns. The carrier materials are also porous and have a surface area of at least about 3 square meters per gram, and preferably at least about 50 square meters per gram. The carrier material should be dry, that is, free of absorbed water. Drying of the carrier material can be effected by heating at about 100° to about 1000° C., and preferably at about 600° C. When the carrier is silica, it is heated at a temperature of at least about 200° C., preferably at about 200° to about 850° C., and most preferably at about 600° C. The carrier material must have at least some active hydroxyl (OH) groups to produce the catalyst composition of this invention. The term "active OH groups" means hydroxyl groups that react chemically with metal-alkyl compounds, such as magnesium and-/or aluminum alkyls.

In the most preferred embodiment, the carrier is silica which, prior to the use thereof in the first catalyst synthesis step, has been dehydrated by fluidizing with nitrogen and heating at about 600° C. for about 16 hours to achieve a surface hydroxyl concentration of about 0.7 mmols/gm. The silica of the most preferred embodiment is a high surface area, amorphous silica (surface area=300 mm²/gm; pore volume of 1.65 cm³/gm), and it is a material marketed under the tradenames of Davison 952 or Davison 955 by the Davison Chemical Division of W.R. Grace and Company. The silica has the shape of spherical particles, e.g., as obtained by a spray-drying process.

The carrier material is slurried in an organic solvent and the resulting slurry is contacted with at least one magnesium compound. The slurry of the carrier material in the solvent is prepared by introducing the carrier material into the solvent, preferably while stirring, and heating the mixture to about 50° to about 90° C., preferably about 50° to about 85° C. The slurry is then contacted with the magnesium compound, while the heating is continued at the aforementioned temperature.

The magnesium compound is selected from the group of compounds having the empirical formulae $Mg(OR)_2$, $R_m^1MgR_n^2$, or $R_k^3MgX_{(2-k)}$, or mixtures thereof, wherein R, $R^1$, $R^2$ and $R^3$ are each an alkyl, such as a $C_2$–$C_{12}$ alkyl, preferably a $C_4$–$C_8$ alkyl, more preferably a $C_4$ alkyl, k, m and n are each 0, 1, or 2, providing that m+n is equal to the valence of Mg, and X is a halogen, preferably chlorine (Cl). The magnesium compound must be soluble in the organic solvent and capable of being deposited onto the carrier containing the active OH groups. Suitable magnesium compounds are Grignard reagents, e.g., methylmagnesium bromide, chloride or iodide, ethylmagnesium bromide, chloride or iodide, propylmagnesium chloride, bromide or iodide, isopropylmagnesium chloride, bromide or iodide, n-butylmagnesium chloride, bromide or iodide, isobutylmagnesium chloride, bromide or iodide; magnesium alkoxides, such as magnesium methoxide, magnesium ethoxide, magnesium propoxide, magnesium butoxide, magnesium pentoxide, magnesium hexoxide, magnesium heptoxide, magnesium octoxide; dialkylmagnesium compounds, wherein the alkyls are the same or different, such as dimethylmagnesium, diethylmagnesium, dipropylmagnesium, dibutylmagnesium, dipentylmagnesium, dihexylmagnesium, diheptylmagnesium, dioctylmagnesium, dinonylmagnesium, methyl-ethylmagnesium, methyl-propylmagnesium, methyl-butylmagnesium, or propyl-butylmagnesium; and magnesium dihalides, such as magnesium dichloride. Dibutylmagnesium was found to be particularly preferred in one embodiment of the invention.

Subsequently, at least one organic compound may be optionally added to the slurry. Suitable organic compounds are alcohols, R—OH; ketones, RCO—R; esters, RCOOR; acids, RCOOH; or organic silicates, $Si(OR)_4$, where R for each of the organic compounds is the same or different linear, branched or cyclic alkyl group of 1–12 carbon atoms, such as methyl, ethyl, propyl, butyl, isobutyl, cyclopropyl, decyl or dodecyl. In each of the organic compounds R may be also be a mixture of any of the aforementioned alkyl groups. Alcohols, such as 1-butanol, are preferred.

Subsequently, a titanium and/or a vanadium compound is added to the slurry and the mixture is continued to be heated at the aforementioned temperature, i.e., at about 50° to about 90° C., preferably at about 50° to about 85° C. Suitable titanium or vanadium compounds used herein are such compounds which are soluble in the organic solvents used in the synthesis. Non-limiting examples of such compounds are titanium and vanadium halides, e.g., titanium tetrachloride, $TiCl_4$, vanadium tetrachloride, $VCl_4$, titanium and vanadium oxyhalide, e.g., vanadium oxytrichloride or titanium oxytrichloride, titanium and vanadium alkoxides, wherein the alkoxide moiety has a branched or unbranched alkyl radical of 1 to about 20 carbon atoms, preferably 1 to about 6 carbon atoms. Titanium compounds, and particularly tetravalent titanium compounds, are preferred. The most preferred titanium compound is titanium tetrachloride. However, if vanadium alkoxides alone, without any other titanium or vanadium compounds containing chlorine (Cl) or bromine (Br) atoms are used in this step of the catalyst synthesis, such vanadium alkoxides must be chlorinated or brominated in the manner known to those skilled in the art to produce an active catalyst.

The aforementioned titanium or vanadium compounds may be used individually or mixtures of such titanium or vanadium compounds may also be used and generally no restrictions are imposed on the titanium or vanadium compounds which may be included. Any titanium or vanadium compound that may be used alone may also be used in conjunction with other titanium or vanadium compounds.

Subsequently, at least one zirconium compound is introduced into the slurry together with a promoter. The zirconium compound has the formula

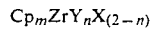

wherein Cp is cyclopentadienyl, m is 1, 2 or 3, Y and X are each the same or different halogen, particularly chlorine, a $C_1$–$C_6$ or hydrogen (H), and n is 0 or 1.

Suitable zirconium compounds are dicyclopentadienyl zirconium dihalide or dicyclopentadienyl zirconium monoalkyl monohalide, wherein the halide groups are chlorine (Cl), bromine (Br) or iodide (I), preferably Cl, and the alkyl groups are $C_1$-$C_6$ alkyls. Mixtures of the zirconium compounds may also be used. Dicyclopentadienyl zirconium dichloride is particularly preferred in one embodiment of the invention. The promoter is at least one aluminoxane compound of the formula

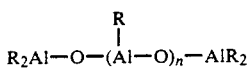

for a linear aluminoxane, where n is 0 to 50 and/or

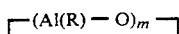

for a cyclic aluminoxane, wherein m is an integer from 3 to 50, and R for both the linear and cyclic aluminoxane is the same or different linear, branched or cyclic alkyl group of 1-12 carbons, such as methyl, ethyl, propyl, butyl, isobutyl, cyclohexyl, decyl or dodecyl. Each of the aluminoxane compounds may contain different R groups and mixtures of the aluminoxane compounds may also be used. Methylaluminoxane is a particularly preferred promoter in one embodiment of the invention. The promoter is used to impregnate the zirconium compound onto the carrier. Without wishing to be bound by any theory of operability, it is believed that the promoter enables the zirconium compound to be deposited onto the carrier. The amount of the promoter is such that it will promote the deposition of the entire amount of the zirconium compound onto the carrier. In a preferred embodiment, the amount of the promoter is such that all of it will be deposited onto the carrier, and substantially none will remain in the solvent. The slurry is stirred for about 1 to about 5 hours at the aforementioned temperature and the solvent is removed by filtration or distillation under vacuum, so that the temperature does not exceed 90° C. All of the catalyst synthesis steps must be conducted at the aforementioned temperature of about 50° to about 90° C., preferably about 50° to about 85° C., because, it is believed, higher temperatures may destroy titanium as the active polymerization site. For example, maintaining the mixture of all of the aforementioned compounds in the solvent at 115° C. for several hours is believed to destroy titanium as the active polymerization site.

Suitable organic solvents are materials in which all of the reactants used herein, i.e., the magnesium compound, the titanium and/or vanadium compounds, the zirconium compound, the promoter and the optional organic compounds are at least partially soluble and which are liquid at reaction temperatures. Preferred organic solvents are benzene, toluene, ethylbenzene, or xylene. The most preferred solvent for one embodiment of the invention is toluene. Prior to use, the solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such amounts of all of the catalyst synthesis reactants, i.e., the magnesium, zirconium, titanium and/or vanadium compounds, the promoter and the optional organic compounds, that will be deposited—physically or chemically—onto the support since any excess of the reactants in the solution may react with other synthesis chemicals and precipitate outside of the support. The carrier drying temperature affects the number of sites on the carrier available for the reactants—the higher the drying temperature the lower thee number of sites. Thus, the exact molar ratios of the magnesium, zirconium, titanium and/or vanadium compounds, the promoter and the optional organic compounds to the hydroxyl groups will vary and must be determined on a case-by-case basis to assure that only so much of each of the reactants is added to the solution as will be deposited onto the support from the solvent without leaving any excess thereof in the solution. Thus, the molar ratios given below are intended to serve only as an approximate guideline and the exact amount of the catalyst synthesis reactants in this embodiment must be controlled by the functional limitation discussed above, i.e., it must not be greater than that which can be deposited onto the support. If greater than that amount is added to the solvent, the excess may react with other reactants, thereby forming a precipitate outside of the support which is detrimental in the synthesis of our catalyst and must be avoided. The amount of the various reactants which is not greater than that deposited onto the support can be determined in any conventional manner, e.g., by adding the reactant, such as the magnesium compound, to the slurry of the carrier in the solvent, while stirring the slurry, until the magnesium compound is detected as a solution in the solvent.

For example, for silica carrier heated at about 200° to about 850° C., the amount of the magnesium compound added to the slurry is such that the molar ratio of Mg to the hydroxyl groups (OH) on the solid carrier is about 0.1 to about 3, preferably about 0.5 to about 2, more preferably about 0.7 to about 1.5, most preferably about 0.8 to about 1.2, depending upon the temperature at which the carrier material was dried. The magnesium compound dissolves in the solvent to form a solution. For the same silica carrier, subjected to the aforementioned heat treatment, if a titanium compound is used in the synthesis, the molar ratio of the Ti to OH groups on the carrier is about 0.1:1 about 10:1, preferably about 1:1; if a vanadium compound is used in the synthesis, the molar ratio of V to the OH groups is about 0.1:1 to about 10:1, preferably about 1:1, and if a mixture of titanium and vanadium compounds is used, the molar ratio of the sum of V and Ti to the OH groups on the solid carrier is about 0.1:1 to about 10:1, preferably about 1:1. The amount of the promoter added to the slurry is such that the molar ratio of Al, derived from the promoter, to the OH groups on the solid carrier is about 0.1 to about 3, preferably about 0.5 to about 2, more preferably about 0.7 to about 1.5, and most preferably about 0.8 to about 1.2, depending upon the temperature at which the carrier material was dried. The Ti:Zr or V:Zr molar ratios in the final catalyst composition are about 1:1 to about 50:1, preferably about 10:1 to about 20:1. If optional organic compounds are used in the synthesis, the amount thereof will be such that they will react with substantially all of the magnesium compounds deposited up to that point in the catalyst synthesis onto the carrier.

It is also possible to add the amounts of the various reactants which are in excess of those which will be deposited onto the support and then remove, e.g., by filtration and washing, any excess of the reactants.

However, this alternative is less desirable than the most preferred embodiment described above. Thus, in the preferred embodiment, the amount of the magnesium, zirconium, titanium and/or vanadium compounds, the promoter and the optional organic compounds, used in the synthesis is not greater than that which can be deposited onto the carrier. The exact molar ratios of Mg to Zr, Ti and/or V and of Mg, Zr, Ti and/or V to the hydroxyl groups of the carrier will therefore vary (depending, e.g., on the carrier drying temperature) and must be determined on a case-by-case basis.

Catalyst Activation

The resulting solid, referred to herein as a catalyst precursor, is combined with a catalyst activator. The activator is a mixture of a conventional olefin polymerization catalyst co-catalyst used to activate the titanium or vanadium sites, and an activator suitable to activate the zirconium sites.

The conventional co-catalyst used herein is any one or a combination of any of the materials commonly employed to activate Ziegler-Natta olefin polymerization catalyst components containing at least one compound of the elements of Groups IB, IIA, IIB, IIIB, or IVB of the Periodic Chart of the Elements, published by Fisher Scientific Company, Catalog Number 5-702-10, 1978. Examples of such co-catalysts are metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures of the co-catalysts may also be employed. Specific examples of useful co-catalysts include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide and hydride, tetramethylgermanium, and tetraethylgermanium. Organometallic co-catalysts which are preferred in this invention are Group IIIB metal alkyls and dialkylhalides having 1 to about 20 carbon atoms per alkyl radical. More preferably, the co-catalyst is a trialkylaluminum compound having 1 to 6, preferably 1 to 4 carbon atoms per alkyl radical. The most preferred co-catalyst is trimethylaluminum. Other co-catalysts which can be used herein are disclosed in Stevens et al, U.S. Pat. No. 3,787,384, column 4, line 45 to column 5, line 12 and in Strobel et al, U.S. Pat. No. 4,148,754, column 4, line 56 to column 5, line 59, the entire contents of both which are incorporated herein by reference. The co-catalyst is employed in an amount which is at least effective to promote the polymerization activity of the titanium and/or vanadium sites of the catalyst of this invention. Preferably, at least about 10 parts by weight of the co-catalyst are employed per part, by weight, of the V or Ti in the catalyst precursor, although higher weight ratios of the co-catalyst to the V or Ti in the catalyst precursor, such as 15:1, 30:1, 50:1 or higher, are also suitable and often give satisfactory results.

The activator suitable for activating the zirconium sites is distinct from the conventional activators described above. The zirconium sites activator is a linear and/or cyclic aluminoxane species prepared from the interaction of $R_3Al$ and water, where R is a $C_1$–$C_{12}$ linear, branched or cyclic alkyl, with the amount of water controlling the average molecular weight of the aluminoxane molecule. As is known to those skilled in the art, the rate of addition of the water to $R_3Al$, the concentration of the $R_3Al$ and water, and the temperature of the reaction may control catalyst properties, such as catalyst activity, molecular weight and molecular weight distribution of the polymers made with the catalyst having its zirconium sites activated with the zirconium sites activator.

The zirconium sites activator is preferably an aluminoxane of the formula

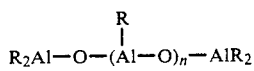

for a linear aluminoxane, where n is 0 to 50 and/or

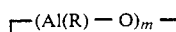

for a cyclic aluminoxane, wherein m is an integer from 3 to 50, and R for both the linear and the cyclic aluminoxane is the same or different linear, branched or cyclic alkyl group of 1–12 carbons, such as methyl, ethyl, propyl, butyl, isobutyl, cyclohexyl, decyl or dodecyl. Each of the aluminoxane compounds may contain different R groups and mixtures of the aluminoxane compounds may also be used.

The most preferred activator for the zirconium sites is methylaluminumoxane. Since the commercially-available methylaluminumoxane is believed to contain trimethylaluminum, in the most preferred embodiment the addition of such a commercial methylaluminumoxane to the catalyst precursor is sufficient to activate both the zirconium sites and the titanium and/or vanadium sites.

The catalyst precursors of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of catalyst precursor. Purification of the solvent employed in the catalyst synthesis is also helpful in this regard.

The precursor may be activated in situ by adding the precursor and the mixture of the activators separately to the polymerization medium. It is also possible to combine the precursor and the activators before the introduction thereof into the polymerization medium, e.g., for up to about 2 hours prior to the introduction thereof into the polymerization medium at a temperature of from about −40° to about 100° C.

Polymerization

Olefins, especially alpha-olefins, are polymerized with the catalysts prepared according to the present invention by any suitable process. Such processes include polymerizations carried out in suspension, in solution, or in the gas phase. Gas phase polymerization reactions are preferred, e.g., those taking place in stirred bed reactors and, especially, fluidized bed reactors.

Because of the unique nature of the catalyst of this invention, relatively low amounts of hydrogen are added intentionally to the reaction medium during the polymerization reaction to control molecular weight of the polymer product. Typical hydrogen ($H_2$): ethylene ($C_2^=$) molar gas phase ratios in the reactor are between about 0.01 and about 0.2, preferably about 0.02 to about 0.05. The reaction temperature is about 70° to about 100° C., residence time is about 1 to about 5 hours, and the amounts of olefins used in the reactor are such that the ethylene partial pressure in the reactor is about 50 to about 250 psi, when ethylene alone or in conjunction with higher alpha-olefins is polymerized. At these polymerization process conditions polymers having multimodal molecular weight distribution are obtained. The polymerization carried out in a single polymerization reactor in the presence of the catalyst of this invention produces polymers having bimodal molecular weight distribution, having polymer chains whose molecular weight ranges from about 1,000 to about 1,000,000. Without wishing to be bound by any theory of operability, it is believed that the bimodal molecular weight distribution is obtained because the zirconium (Zr) catalytic sites under certain polymerization conditions, i.e., the amount so hydrogen specified herein, produce relatively short polymer chains, having relatively low molecular weight. In contrast the titanium (Ti) and/or vanadium (V) catalytic sites, under the same polymerization conditions, produce relatively long polymer chains, of relatively high molecular weight. The polymer product, therefore, contains both types of polymer chains, resulting in the multimodal molecular weight distribution. The multimodal molecular weight distribution is important because the resins having such molecular weight distribution are relatively easily processed, e.g., in an extruder, and because such resins produce films having good strength properties.

The molecular weight distribution of the polymers prepared in the presence of the catalysts of the present invention, as expressed by the melt flow ratio (MFR) values, varies from about 50 to about 300, preferably about 100 to about 200, for medium density polyethylene (MDPE) products having a density of about 0.930 to about 0.940 g/cc, and an $I_2$ (melt index) of about 0.01 to about 1 g/10 min. Conversely, HDPE products, produced with the catalysts of this invention, have a density of about 0.940 to about 0.960 g/cc, flow index ($I_{21}$) of about 1 to about 100, preferably about 4 to about 40, MFR values of about 50 to about 300, preferably about 100 to about 200. As is known to those skilled in the art, at the aforementioned flow index values, these MFR values are indicative of a relatively broad molecular weight distribution of the polymer. As is also known to those skilled in the art, such MFR values are indicative of the polymers specially suitable for high density polyethylene (HDPE) film and blow molding applications. The gel permeation chromatography (GPC) traces of polymers with the mixed metal catalyst of this invention show broad and bimodal molecular weight distribution (MWD). The details of the MWD are controlled by catalyst composition and reaction conditions. The bimodal MWD can be exploited to produce the proper balance of mechanical properties and processability.

The catalysts prepared according to the present invention are highly active and may have the activity of at least about 1.0 to about 10.0 kilograms of polymer per gram of catalyst per 100 psi of ethylene in about 1 hour.

The linear polyethylene polymers prepared in accordance with the present invention are homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/propylene copolymers, ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. Ethylene/1-hexene is the most preferred copolymer polymerized in the process of and with the catalyst of this invention.

The polyethylene polymers produced in accordance with the present invention preferably contain at least about 80 percent by weight of ethylene units.

A particularly desirable method for producing polyethylene polymers according to the present invention is in a fluid bed reactor. Such a reactor and means for operating it are described by Levine et al, U.S. Pat. No. 4,011,382, Karol et al, U.S. Pat. No. 4,302,566 and by Nowlin et al, U.S. Pat. No. 4,481,301, the entire contents of all of which are incorporated herein by reference. The polymer produced in such reactor contains the catalyst particles because the catalyst is not separated from the polymer.

The following examples further illustrate additional features of the invention. However, it will be apparent to those skilled in the art that the specific reactants and reaction conditions used in the Examples do not limit the scope of the invention.

The properties of the polymers produced in the Examples and any calculated process parameters were determined by the following test methods:

Density: ASTM D 1505—A plaque is made and conditioned for one hour at 100° C. to approach equilibrium crystallinity. Measurement for density is then made in a density gradient column; reported as gms/cc.

Melt Index (MI), $I_2$: ASTM D-1238—Condition E—Measured at 190° C.—reported as grams per 10 minutes.

High Load Melt Index (HLMI), $I_{21}$: ASTM D-1238—Condition F—Measured at 10 times the weight used in the melt index test above.

Melt Flow Ratio (MFR)=$I_{21}/I_2$

Productivity: A sample of the resin product is ashed, and the weight percent of ash is determined; since the ash is substantially composed of the catalyst, the productivity is thus the pounds of polymer produced per pound of total catalyst consumed. The amount of Ti, Mg, V an Al in the ash is determined by elemental analysis.

EXAMPLE 1

(Catalyst Precursor Synthesis)

All procedures were performed under a dry nitrogen atmosphere.

SOLUTION (A): 0.317 grams of zirconium dicyclopentadienyl dichloride ($Cp_2ZrCl_2$) was transferred to a 100 ml round-bottom flask and then 50 mls of dry toluene were added. The flask was placed into a 50° C. oil bath until a clear solution was formed.

SOLUTION (B): 50 mls of dry toluene and 12 mls of methylaluminumoxane (MAO) (4.6 wt % Al in toluene)

were added to a 200 cc pear flask. The pear flask was placed into an oil bath set to 50° C. Next, 20 mls of solution (A) was added to the pear flask to yield a clear light yellow solution.

CATALYST PREPARATION SOLUTION: 10.095 grams of Davison Chemical Company's grade 955 silica which had been heated at 600° C. for about 16 hours under a dry nitrogen purge was weighed into a 500 cc pear flask containing a magnetic stirring bar. The flask was placed into a 80° C. oil bath and 50 mls of dry toluene was added to the flask. Next, 7.2 mls of dibutylmagnesium (0.973 mmol/ml) was added to the silica/toluene slurry. The contents of the flask were stirred for 50 minutes. Then, 0.80 mls of neat titanium tetrachloride was added to the flask. The slurry turned a dark brown color and stirring was continued for 60 minutes. Finally, the entire contents of solution (B) were siphoned into the catalyst preparation flask, and the slurry was stirred for 60 minutes. After this time, all solvents were removed by evaporation under a nitrogen purge. Catalyst yield was 12.805 grams of a dark-brown free-flowing powder.

EXAMPLE 2

(Polymerization Process)

An ethylene/1-hexene copolymer was prepared with the catalyst precursor of Example 1 in the following representative procedure.

A 1.6 liter stainless steel autoclave, maintained at about 50° C., was filled with 0.750 liters of dry hexane, 0.030 liters of dry 1-hexene, and 5.1 mmols of methylaluminumoxane (MAO) while under a slow nitrogen purge. The reactor was closed, the stirring rate was set at about 900 rpm, the internal temperature was increased to 70° C., and the internal pressure was raised from 8 psi to 11 psi with hydrogen. Ethylene was introduced to maintain the pressure at about 114 psi. Next, 0.0349 grams of the Example 1 catalyst precursor was introduced into the reactor with ethylene over-pressure and the temperature was increased and held at 85° C. The polymerization was continued for 60 minutes, and then the ethylene supply was stopped and the reactor allowed to cool to room temperature. 110 grams of polyethylene were collected.

Figure 2:
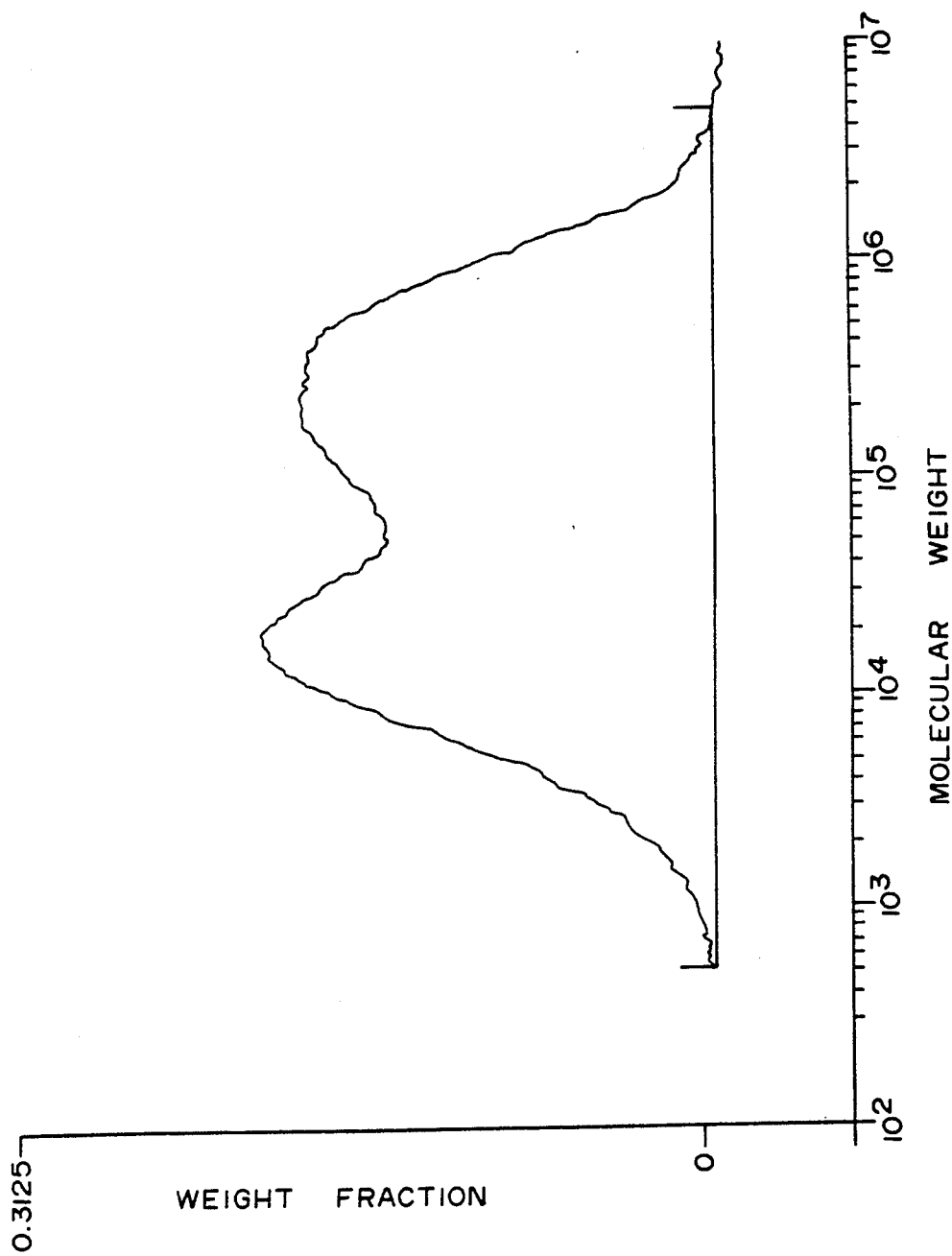
FIG. 2 is a GPC graph of molecular weight distribution of a polymer produced with the catalyst and the process of this invention discussed in Example 2.

The MWD of the polymer wall examined by GPC, and the results clearly showed that the polymer had a bimodal MWD (FIG. 2).

EXAMPLE 3

(Catalyst Precursor Synthesis)

191.4 grams of Davision grade 955 silica which was previously dried at 600° C. for 16 hours was added to a nitrogen purged, 4-neck, 3-liter round-bottom flask fitted with an overhead stirrer. Toluene (800 mls) was added to the flask and the flask was placed into an oil bath maintained at 60° C. Next, 129 mls of dibutylmagnesium (1.04 Molar solution in heptane) was added to the silica/toluene slurry. The solution was stirred for 35 minutes. Then, 15.0 mls of neat TiCl4 was diluted with 50 mls of dry toluene and added to the flask. The solution was stirred for 60 minutes. Finally, 93 mls of methyl aluminoxane (4.6 wt % Al) and 2.41 g of Cp$_2$ZrCl$_2$ were added to a 125 ml addition funnel to yield a clear yellow solution. This solution was added to the silica/toluene slurry and the oil bath temperature was increased to 80°–85° C.

The slurry was heated for 3 hours. After this time, the oil bath temperature was lowered to 50° C. and stirring was stopped to allow the silica to settle. The supernatant liquid was decanted and the silica was washed three times with 1500 mls of dry hexane. The silica was dried under a nitrogen purge to yield about 233 grams of dry, free-flowing powder.

EXAMPLE 4

(Polymerization Process)

The catalyst precursor composition of Example 3 was used to prepare an ethylene/1-hexene co-polymer in a fluid bed, pilot plant reactor operated substantially in the manner disclosed by Nowlin et al, U.S. Pat. No. 4,481,301. A steady-state operation was obtained by continuously feeding the catalyst precursor, MAO activator, and reactant gases (ethylene, 1-hexene and hydrogen) to the reactor while also continuously withdrawing polymer product from the reactor. The reactor operating conditions were as follows:

| | |
|---|---|
| Ethylene | 210 psi |
| (C$_6$=/C$_2$=) vapor mole ratio | 0.039 |
| (H$_2$/C$_2$=) vapor mole ratio | 0.050 |
| Production Rate | 24.9 lbs/hr |
| Catalyst Productivity | 3000 grams polymer/gm catalyst |
| Residence Time | 2.5 hours |
| Temperature | 90° C. |
| MAO feed | 270 mls/hr (1.0 wt % Al in toluene) |

The polymer had the following properties:

| | |
|---|---|
| Density | 0.942 gms/cc |
| Flow Index (I$_{21}$) | 16.3 gms/10 min |

Figure 3:
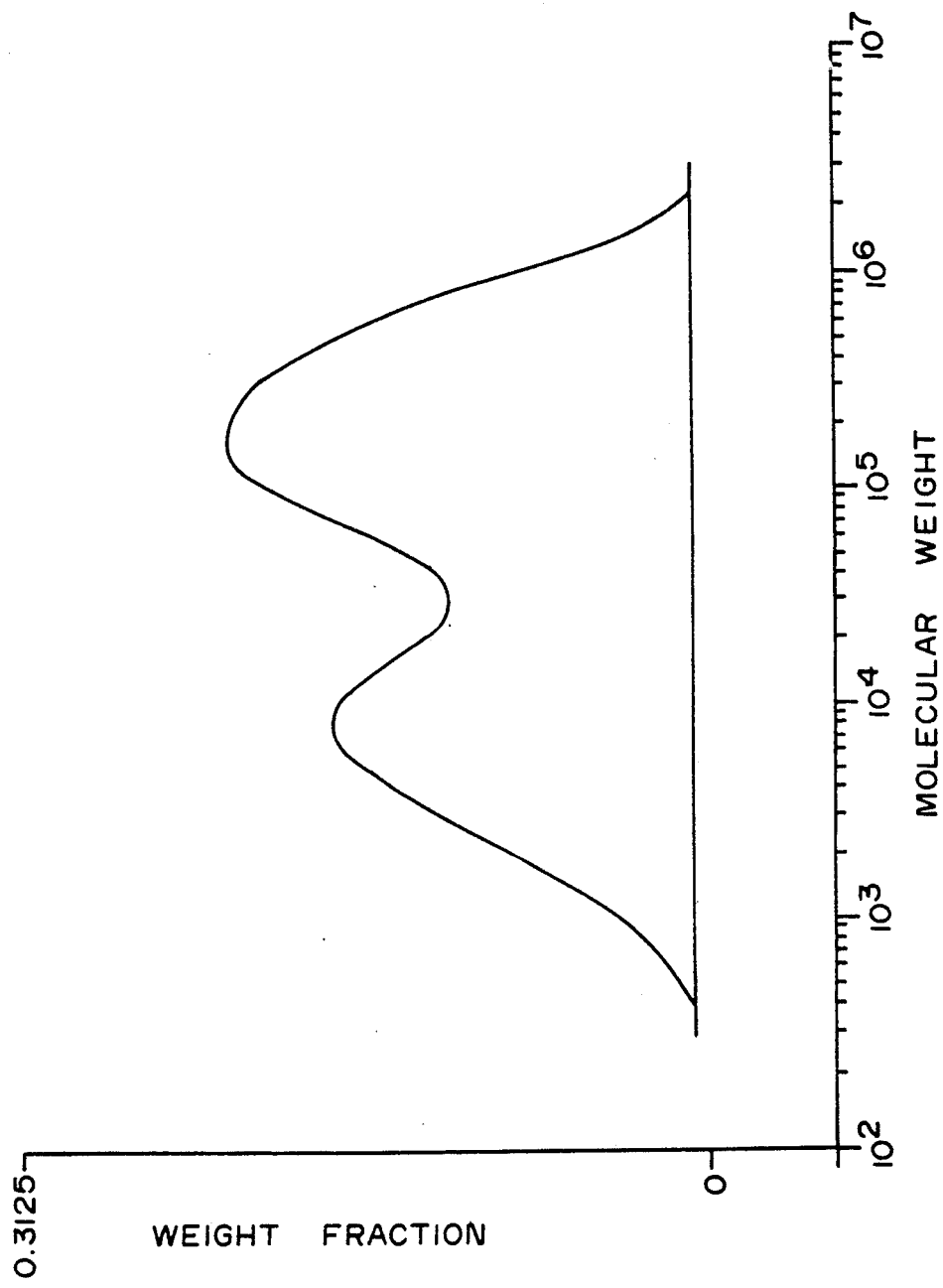
FIG. 3 is a GPC graph of a molecular weight distribution of a polymer produced with a catalyst and the process of this invention discussed in Example 4.

The molecular weight distribution of the polymer was examined by GPC and the results clearly showed that the polymer had a bimodal MWD (FIG. 3).

It will be apparent to those skilled in the art that the specific embodiments discussed above can be successfully repeated with ingredients equivalent to those generically or specifically set forth above and under variable process conditions.

From the foregoing specification, and one skilled in the art can readily ascertain the essential features of this invention and without departing from the spirit and scope thereof can adapt it to various diverse applications.

We claim:

1. An olefin polymerization catalyst precursor composition supported on a porous carrier which has active OH groups comprising a magnesium compound, a zirconium compound, and TiCl$_4$, wherein the magnesium compound has the formula:

$$Mg(OR)_2, R^1{}_mMgR^2{}_n \text{ or } R^3{}_kMgX_{(2-k)}$$

where R, R$^1$, R$^2$, and R$^3$ each are each alkyl groups, X is a halogen, m and n are each 0, 1 or 2, providing that m+n equals the valence of Mg, and k is 0, 1, or 2; and wherein the zirconium compound has the formula $$Cp_mZrY_nX_{(2-m)}$$

wherein Cp is cyclopentadienyl, m is 1, 2 or 3, Y and X are each the same or different halogen, a $C_1$-$C_6$ alkyl or hydrogen and n is 0 or 1, which is produced by impregnating a reaction product of said carrier and said magnesium compound with said zirconium compound; wherein the reaction product is treated with said titanium compound prior to impregnating.

2. A precursor composition of claim 1 which has a Ti:Zr molar ratio of about 1:1 to about 50:1.

3. A precursor composition of claim 2 which has a Ti:Zr molar ratio of about 10:1 to about 20:1.

4. A precursor composition of claim 1 which additionally comprises at least one organic compound which is: an alcohol of the formula R—OH; ketone of the formula RCO—R; an ester of the formula RCOOR; an acid of the formula RCOOH; or an organic silicate of the formula $Si(OR)_4$, where R for each of the organic compounds is the same or different linear, branched, or a cyclic alkyl group of 1-12 carbon atoms.

5. A precursor of claim 4 wherein the organic compound is an alcohol.

6. A precursor of claim 4 wherein the organic compound is butanol.

7. A catalyst composition comprising the precursor of claim 1 and a catalyst activator which is a mixture of a co-catalyst containing at least one compound of the elements of Group IB, IIA, IIIB, or IVB of the Periodic Chart of the Elements and a zirconium sites activator which is an aluminoxane of the formula

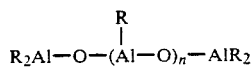

for a linear aluminoxane, where n is 0 to 50 and/or

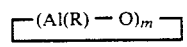

for a cyclic aluminoxane, wherein m is an integer from 3 to 50, and R for both the linear and the cyclic aluminoxane is the same or different linear, branched or cyclic $C_1$-$C_{12}$ alkyl group.

8. A catalyst composition of claim 7 wherein the co-catalyst is a Group IIIB metal alkyl or dialkyhalide having 1 to 20 carbon atoms per alkyl radical.

9. A catalyst composition of claim 8 wherein the co-catalyst is a trialkylaluminum compound having 1 to 6 carbon atoms per alkyl radical.

10. A catalyst composition of claim 9 wherein the co-catalyst is a trialkyaluminum compound having 1 to 4 carbon atoms per alkyl radical.

11. A catalyst composition of claim 10 wherein the co-catalyst is trimethylaluminum.

12. A catalyst composition of claim 11 wherein the aluminoxane is methylaluminoxane.

13. The precursor composition of claim 1, wherein the zirconium compound is admixed with an aluminoxane compound of the formula

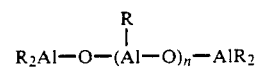

for a linear aluminoxane, where n is 0 to 50 and/or

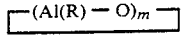

for a cyclic aluminoxane, wherein m is an integer from 3 to 50, and R for both the linear and the cyclic aluminoxane is the same or different linear, branched or cyclic $C_1$-$C_{12}$ alkyl group.

14. The precursor composition of claim 1, wherein the zirconium compound is admixed with an aluminoxane compound of the formula

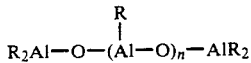

for a linear aluminoxane, where n is 0 to 50 and/or

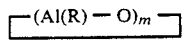

for a cyclic aluminoxane, wherein m is an integer from 3 to 50, and R for both the linear and the cyclic aluminoxane is the same or different linear, branched or cyclic $C_1$-$C_{12}$ alkyl group.

15. A method of synthesizing an olefin polymerization catalyst precursor composition comprising contacting a solid, porous carrier having reactive OH groups with a magnesium compound, a zirconium compound, and a compound selected from the group consisting of titanium compounds, vanadium compounds and mixtures thereof; wherein the magnesium compound has the formula:

$$Mg(OR)_2, R_m^1MgR_n^2, \text{ or } R_k^3MgX_{(2-k)}$$

where R, $R^1$, $R^2$ and $R^3$ are each alkyl groups, X is a halogen, k, m, and n are each 0, 1, or 2, providing that m+n equals the valence of Mg;
the zirconium compound has the formula $Cp_mZrY_nX_{(2-n)}$ wherein Cp is cyclopentadienyl, m is 1, 2 or 3, Y and X are each a halogen, a $C_1$-$C_6$ alkyl or hydrogen, and n is 0 or 1;
the titanium compound is a titanium halide and the vanadium compound is a vanadium halide, a vanadium oxyhalide or mixtures thereof;
wherein the contacting is conducted in the presence of an organic solvent in the magnesium compound, the zirconium compound, the titanium compound, the vanadium compound, or mixtures of the titanium and vanadium compounds are soluble;
wherein the solid, porous carrier is contacted with the zirconium compound in the presence of an aluminoxane compound of the formula

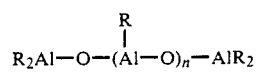

for a linear aluminoxane, where n is 0 to 50 and/or

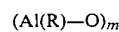

for a cyclic aluminoxane, wherein m is an integer from 3 to 50, and R for both the linear and the cyclic aluminoxane is the same or different linear, branched or cyclic $C_1$-$C_{12}$ alkyl group, which process comprises reacting said carrier with said magnesium compound and titanium compound and, subsequently, undertaking contacting with said zirconium compound.

16. A method of claim 15 wherein after the carrier is contacted with the magnesium compound but before it is contacted with the zirconium compound, the carrier is contacted with at least one organic compound, soluble in the organic solvent, which is: an alcohol of the formula R—OH; a ketone of the formula RCO—R; an ester of the formula RCOOR; an acid of the formula RCOOH; or an organic silicate of the formula Si(OR)$_4$, where R for each of the organic compounds is the same or different linear, branched, or a cyclic alkyl group of 1-12 carbon atoms.

17. A method of claim 16 wherein the organic compound is an alcohol.

18. A method of claim 17 wherein the organic compound is butanol.

19. The process of claim 15, wherein the zirconium compound is admixed with an aluminoxane compound of the formula

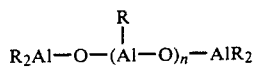

for a linear aluminoxane, where n is 0 to 50 and/or

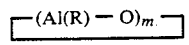

for a cyclic aluminoxane, wherein m is an integer from 3 to 50 and R for both the linear and the cyclic aluminoxane is the same or different linear, branched or cyclic $C_1$-$C_{12}$ alkyl group.

* * * * *